(12) United States Patent
Halberstadt

(10) Patent No.: US 8,339,817 B2
(45) Date of Patent: Dec. 25, 2012

(54) METHOD OF OPERATING A RESONANT POWER CONVERTER AND A CONTROLLER THEREFOR

(75) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 237 days.

(21) Appl. No.: 12/865,802

(22) PCT Filed: Feb. 3, 2009

(86) PCT No.: PCT/IB2009/050438
§ 371 (c)(1),
(2), (4) Date: Aug. 25, 2010

(87) PCT Pub. No.: WO2009/098640
PCT Pub. Date: Aug. 13, 2009

(65) Prior Publication Data
US 2011/0002145 A1  Jan. 6, 2011

(30) Foreign Application Priority Data
Feb. 4, 2008  (EP) .................................... 08101254

(51) Int. Cl.
*H02M 3/335* (2006.01)
*H02M 7/00* (2006.01)

(52) U.S. Cl. ........... 363/24; 363/25; 363/26; 363/21.02; 363/21.03

(58) Field of Classification Search .......... 363/24, 363/25, 26, 21.02, 21.03
See application file for complete search history.

(56) References Cited

U.S. PATENT DOCUMENTS

| | | | |
|---|---|---|---|
| 6,344,979 B1* | 2/2002 | Huang et al. | 363/16 |
| 6,418,038 B2* | 7/2002 | Takahama et al. | 363/17 |
| 6,433,491 B2* | 8/2002 | Halberstadt | 315/224 |
| 6,496,387 B2* | 12/2002 | Halberstadt | 363/17 |
| 7,184,280 B2* | 2/2007 | Sun et al. | 363/21.02 |
| 7,701,736 B2* | 4/2010 | Yang et al. | 363/89 |
| 7,742,318 B2* | 6/2010 | Fu et al. | 363/16 |
| 7,885,084 B2* | 2/2011 | Yang et al. | 363/21.01 |
| 7,944,716 B2* | 5/2011 | Halberstadt | 363/25 |
| 2001/0036090 A1* | 11/2001 | Halberstadt | 363/21.02 |
| 2002/0012257 A1* | 1/2002 | Takahama et al. | 363/95 |
| 2006/0187686 A1* | 8/2006 | Sun et al. | 363/17 |
| 2007/0236967 A1* | 10/2007 | Liu et al. | 363/21.02 |

(Continued)

FOREIGN PATENT DOCUMENTS

EP   0 542 197 A2   5/1993

(Continued)

OTHER PUBLICATIONS

International Search Report and Written Opinion for Application PCT/IB2009/050438 (Feb. 3, 2009).

*Primary Examiner* — Bao Q Vu

(57) ABSTRACT

A method of operating a resonant power converter(1, 2), having a high side switch(3) and a low side switch(4), is disclosed in which the switching is controlled to allow for improved operation at low power levels. The method involved an interruption to the part of the switching cycle in which the low side switch (4) is normally closed, by opening the switch at a particular moment in the cycle which allows the energy to be store in the resonance capacitor (5). Since, as a result, the energy is largely not resonating but stored in a single component, the time quantization of the mode of operation is significantly reduced or eliminated.

23 Claims, 12 Drawing Sheets

U.S. PATENT DOCUMENTS

| | | | |
|---|---|---|---|
| 2008/0084167 A1* | 4/2008 | Waffenschmidt et al. | 315/210 |
| 2008/0266908 A1* | 10/2008 | Halberstadt | 363/21.02 |
| 2009/0034299 A1* | 2/2009 | Lev | 363/17 |
| 2009/0040792 A1* | 2/2009 | Yang et al. | 363/21.06 |
| 2009/0091951 A1* | 4/2009 | Yang et al. | 363/21.06 |
| 2009/0109715 A1* | 4/2009 | Yang et al. | 363/89 |
| 2009/0303753 A1* | 12/2009 | Fu et al. | 363/20 |
| 2010/0033998 A1* | 2/2010 | Halberstadt | 363/97 |
| 2010/0208499 A1* | 8/2010 | Halberstadt | 363/21.1 |

FOREIGN PATENT DOCUMENTS

| | | |
|---|---|---|
| WO | 2005/112238 A2 | 11/2005 |
| WO | 2009/004582 A1 | 1/2009 |

* cited by examiner

METHOD OF OPERATING A RESONANT POWER CONVERTER AND A CONTROLLER THEREFOR

FIELD OF THE INVENTION

The present invention relates to power supplies and in particular to resonant mode power converters.

The present invention is particularly relevant to devices that require a variable level of power, and to devices that require a normal level of power as well as a lower level of power for use in a standby mode. Examples of such devices are consumer electronics such as computers, televisions and the like.

BACKGROUND OF THE INVENTION

Power converters for consumer applications typically operate at partial load under standby conditions for a relatively large part of their lifetime. Whilst functioning in this mode, it is desirable to draw power from the mains supply at as low level as is conveniently possible. Therefore it is desirable to use a power converter design for the power supply which operates with a high efficiency not only under full load conditions, but also for partial load, and particularly for low power standby mode.

Power supplies operating under nominal "no load" conditions of operation need at least to convert a small amount of power in order to supply their own circuitry such as IC, resistive components and optocouplers. No load input power levels below, for example, 300 mWatt and input power levels below 1 Watt at 500 mWatts output are becoming increasingly common as standard requirements.

For powers larger than approximately 100 Watts at full load resonant LLC topology is of interest and commonly adopted due to its high efficiency, small volumes and high power density. However, one of the main disadvantages for resonant LLC topology is its relatively low efficiency under low load conditions (when operated in the most common operation mode, that is, using a 50% duty cycle). Losses in this mode of operation may be a multiple of the required standby power.

One known method of controlling an LLC topology, under low load conditions, is the so-called "burst-mode" method. In this method, the power converter is used under nominal operating conditions for a certain, relatively short, period, and then completely switched off, for a longer period. This method is disadvantageously noisy (in the audio range), and requires a large smoothing capacitance on the output side. Also the efficiency is limited, because a fixed frequency is applied above the normal operating frequency, necessary due to component tolerances, giving a relatively low power level during the burst.

A method of improving the efficiency of LLC topology power converters has been proposed in patent application publication WO2005/112238A2. This publication discloses a method wherein the timing of the two control switches is such that the high side switch (HSS) conducts for a short interval during which both the primary current increases to a certain level and magnetising energy is built up in the transformer. It is during this interval that most of the output current is delivered. At the end of this interval the HSS is turned off, and the low side switch (LSS) is turned on shortly after this moment (the duration of the gap being such as to facilitate soft switch-on of the LSS, as is well known by those skilled in the art). The output current rapidly decreases to zero. The magnetising current starts to resonate in an LCC resonant circuit which is defined by the resonant capacitor, leakage inductance and the magnetising inductance in series. At a moment corresponding to the Nth negative maximum of the magnetising current, the LSS is turned off. The integer N can typically have a value from 0 to several hundred. At that moment the half bridge node between the HSS and LSS is charged by the magnetising current and provides a soft switch-on for the HSS, ready for the next HSS conduction interval.

Although this method makes it possible to significantly increase the efficiency of the power converter, it has a disadvantage in that the LSS may be turned off only at moments in time corresponding to the Nth negative maximum of the magnetising current, where N is an integer. This has the result that the switching cycle period of the power converter is quantised, and can only take certain discrete values. This has implications for the possible values of the output power, as well as for the switching period. Further, this may result in an increased risk of audio noise and may give extra ripple in the output voltage. In particular a resonance of the magnetising current combined with a repetition frequency lying in the audio band is likely to increase the audio noise of the power converter. Furthermore, a resonating magnetizing current can also give rise to losses in the core, as well as conduction losses.

SUMMARY OF THE INVENTION

It is an object of the present invention to allow improved control of the switching period, and thus to reduce or eliminate the requirement for discrete steps in power.

According to an aspect of the present invention there is provided a method of controlling a resonant power converter, the resonant power converter having a switching cycle period and comprising a primary side circuit comprising a first switch and a second switch connected in series and having a half-bridge node therebetween, the primary side circuit being connectable between a supply voltage and a ground, a resonant capacitor forming part of a resonance circuit, and an inductor forming another part of the resonance circuit, the method comprising the steps of: at the start of the switching cycle period closing the first switch for a first period, opening the first switch at the end of the first period and thereafter closing the second switch for a second period, opening the second switch at the end of the second period and thereafter closing the first switch to conclude the switching cycle period, characterised in that the method includes the step of interrupting the second period by opening the second switch at the end of an initial part of the second period, storing energy in the resonant capacitor whilst the second switch is open during this initial part, and closing the second switch for the remainder of the second period. Thus whilst the second switch is open during the initial part, energy is stored, that is, the charge is retained, in the resonant capacitor. In other words, the resonant capacitor retains change and stores energy during this part.

Preferably, the second switch is opened to interrupt the second period at a moment when there is substantially no current in the primary side of the circuit. At this moment it is ensured that the resonant power resides entirely in the resonant capacitor (Cr). Alternatively, a second switch is opened to interrupt the second period at a moment when the current in the primary side circuit is approximately zero and in particular, the second switch may be opened to interrupt the second period between within 0.5 µs of a moment when there is no current in the primary side circuit. In this case the primary current will be positive in order to prevent the voltage at the half-bridge node rising during the first part of the LSS conduction interval.

Preferably, there is a delay between opening the first switch and closing the second switch such that zero voltage switching of the second switch occurs. Further, there may be a second delay between opening the second switch and closing the first switch such that zero voltage switching of the first switch occurs. This is known to reduce switching losses in the switches.

Preferably, the first part of the second period has a duration which is longer than the resonant period of the resonant circuit. The invention is thus particularly suited, although not limited, to operation at low level, standby mode, or partial load conditions.

Preferably, at least the duration of the first part of the second period is adapted for use with a resonant power converter in which the resonant capacitor is connected between the half-bridge node and a Vcap node. Alternatively, at least the duration of the first part of the second period is adapted for use with a resonant power converter in which the resonant capacitor is connected to the second switch and connectable in use to ground.

Preferably, the duration of the first period and the duration of the second period are each controlled in dependence on the voltage at the Vcap node, to achieve a desired energy transfer per cycle, and, or in the alternative, they may be each further controlled to achieve a desired switching cycle period. Thus the method of the invention may be directly utilised to control either or both of the energy per cycle and the switching cycle period, and thus the output power of the energy converter.

Preferably, the method includes a further step of within the initial part of the second period, opening the second switch thereby starting an energy dump interval, and closing the second switch at the end of the energy dump interval. In some embodiments, the second switch is closed at the end of the energy dump interval at a moment when the primary current reverses polarity. Alternatively and without limitation, the second switch may be closed at the end of the energy dump interval at a moment which is after the primary current reverses polarity and which is when the voltage at the half-bridge node is at a negative maximum Furthermore in some embodiments, the second switch is opened to start the energy dump interval at a moment at which a magnetizing current in the inductor is at a negative maximum; alternatively and without limitation, the second switch may be opened to start the energy dump interval at a moment when the modulus of the voltage across the resonant capacitor is equal to the modulus of the voltage of the resonant capacitor at the start of the second period.

Calculation of the optimum time or times to open or close, or both open and close, the second switch, to respectively commence and conclude an energy dump interval, may beneficially be carried out with the aid of reference to a state plane representation of the switching, as will be discussed herebelow. Similarly, the determination of the optimum moment to interrupt the second period, may also at usefully it be carried out with the aid of or reference to state plane representation.

Embodiments wherein the opening and or closing of the second switch to define an energy dump period is as given above are relevant to discontinuous conduction mode operation; in other embodiments, the step of interrupting the second period further comprises an energy dump interval. In those embodiments, the second switch is not separately opened and closed for an energy dump interval, since in that case, the time of the interruption results in the energy dump it integral to the interruption. In such embodiments the small spiral (as will be discussed below in relation to state plane representation) is reached without re-closing the second switch. An energy storate phase is thereby contiguous with an energy dump phase.

According to another aspect of the present invention, there is provided a controller for a resonant power converter, the resonant power converter having a switching cycle period and comprising a primary side circuit comprising a first switch and a second switch connected in series and having a half-bridge node therebetween, the primary side circuit being connectable between a supply voltage and a ground, the resonant power converter further having a resonant capacitor forming part of a resonance circuit, the controller being adapted to control the operation of the first switch and the second switch in accordance with the method of any preceding claim.

The controller preferably may comprise a respective drive circuit for driving each of the first and the second switches. More preferably the controller including the respective drive circuits is packaged in a single package, and more preferably still, the controller including the respective drive circuits is implemented on a single semiconductor chip. This provides a particularly convenient and space-efficient solution.

These and other aspects of the invention will be apparent from and elucidated with reference to the embodiment described hereinafter.

BRIEF DESCRIPTION OF DRAWINGS

Embodiments of the invention will be described, by way of example only, with reference to the drawings, in which.

Figure 1:
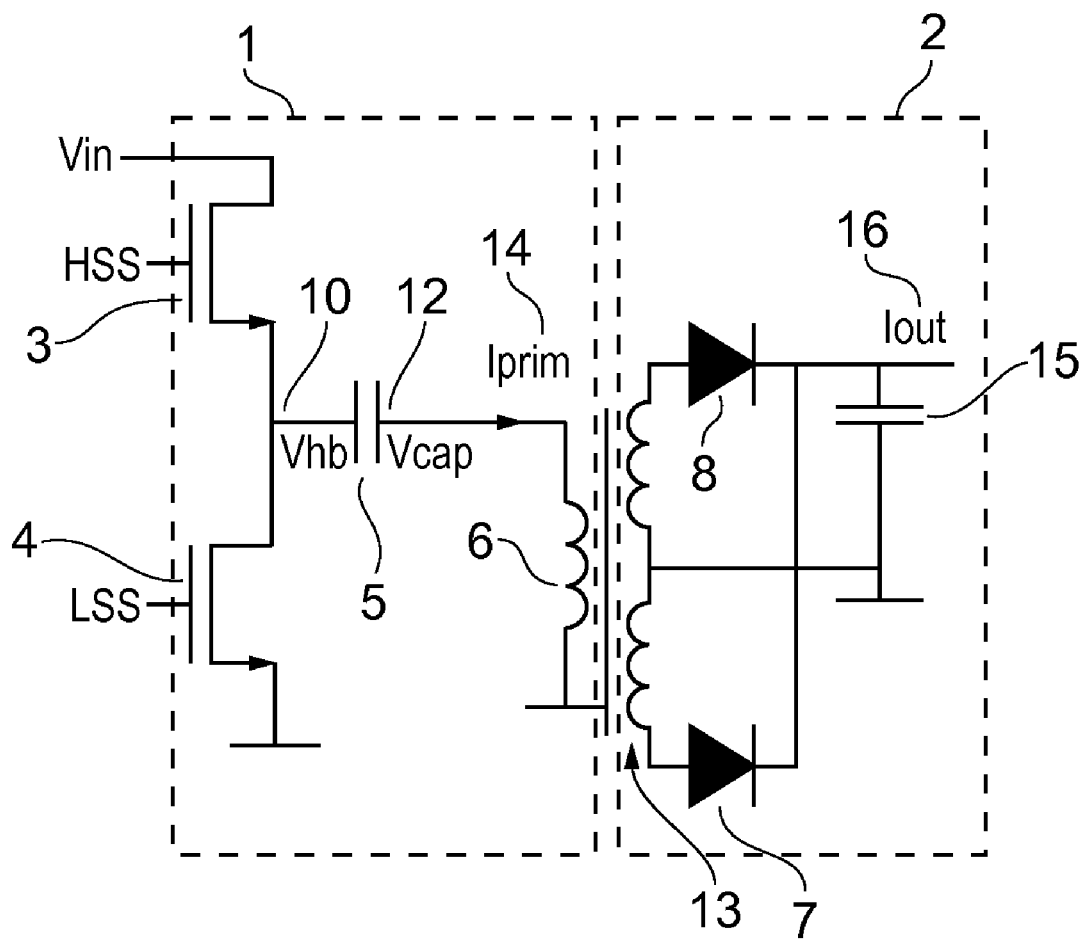
FIG. 1 is a schematic diagram of a typical resonant power converter.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

FIG. 1 shows a resonant power supply for use in accordance with embodiments of the invention. The resonant power supply comprises a primary side circuit 1, and a secondary side circuit 2. The primary side circuit 1 comprises a pair of switches 3 and 4, that is a HSS 3 in series with a LSS 4. In use the switches are connected in series between ground and a supply voltage, Vin. The node 10 between the switches is termed the half bridge node, and the voltage at this point is Vhb. The half bridge node 10 is series connected to the primary winding 6 of a transformer 13 via resonant capacitor Cr, 5. The voltage at the capacitor terminal 12 on the transformer side is depicted by Vcap. The current 14 in the primary circuit is Iprim. The inductance in the primary side circuit, and in particular in the primary winding 6, comprises two components, that is the magnetising inductance (Lm) and the series inductance (Ls). Thus together with the resonant capacitance Cr 5 the primary side circuit comprises an LLC resonant circuit.

The secondary side circuit 2 comprises a pair of rectifying diodes 7 and 8 connected in series with secondary windings of the transformer, and with a smoothing capacitor 15. These provide an output current 16, Iout.

In overview, during normal operation according to a conventional method, the switches 3 and 4 are alternately switched on. The voltage at the half bridge node 10 is thus alternately high (when the HSS 3 is on or conducting and the LSS 4 is off or not conducting), and low (when LSS is on and HSS is off). The capacitor 5 smoothes the voltage Vhb at the half bridge node to some extent. Thus the primary side of the transformer is presented with an alternating voltage (and alternating current), the magnitude of which depends on the mark-space ratio, or duty cycle, of the switching. The voltage at the secondary side, which is dependant on the turns ratio of the transformer, is thus affected by the above duty cycle.

In accordance with an embodiment of the invention, the above switching cycle is modified by way of interruption, in order to allow variation of the switching period.

Figure 2:
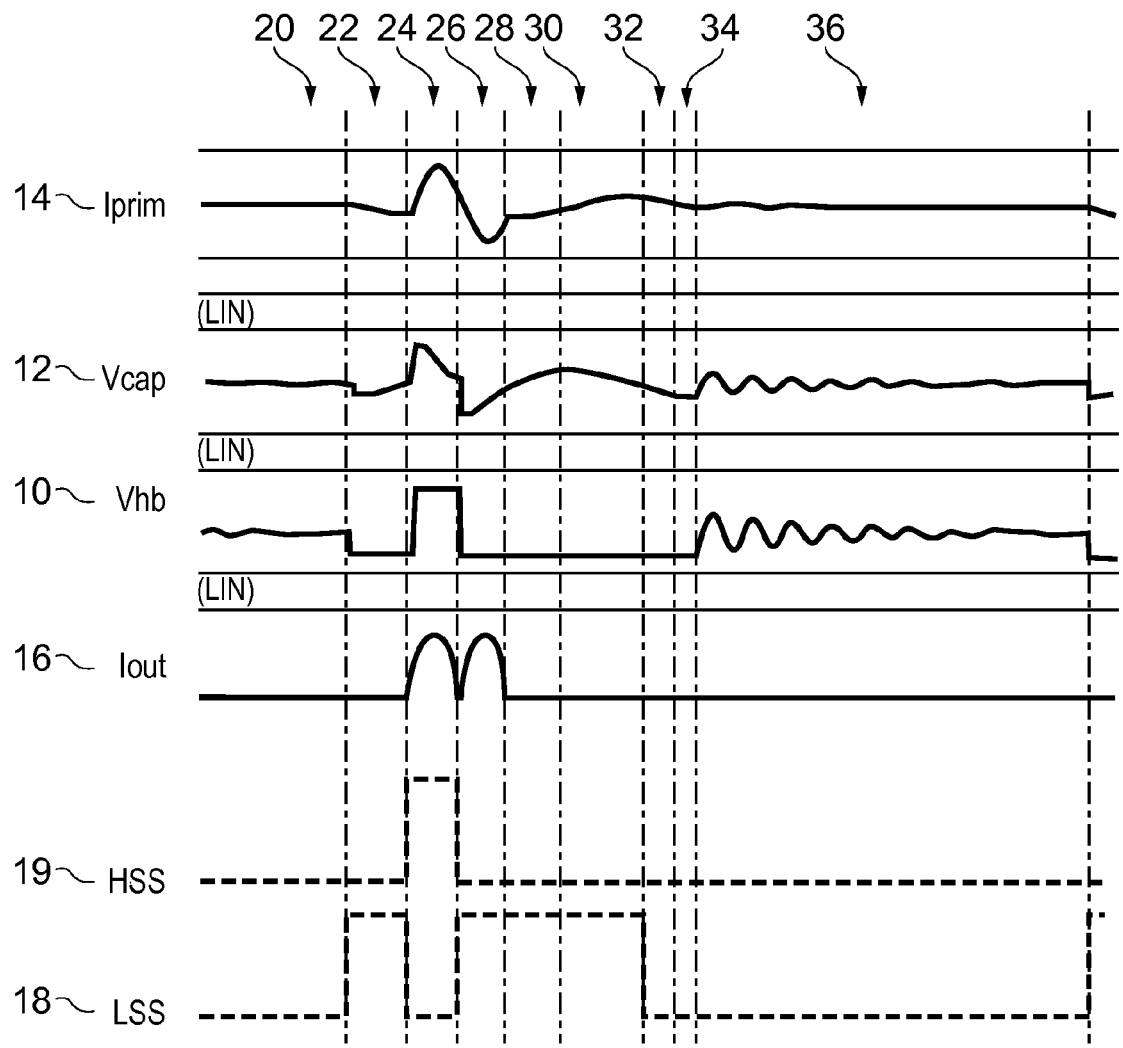
FIG. 2 shows wave forms of a power converter depicted in FIG. 1, in operation in accordance with a method according to an embodiment of the present invention.

The switching cycle, including the interruption (over intervals 32, 34, and 36), is shown in detail in FIG. 2. This Figure depicts the wave forms of selected parameters of a power converter operated in accordance with the method of an embodiment of the invention. In particular, the Figure shows the wave form of the primary current 14 (Iprim), the voltage at the transformer side of the resonant capacitor (Vcap) 12, the voltage Vhb at the half bridge node 10, and the output current 16, Iout. The Figure also shows the switching states 18 and 19 of the LSS and HSS. Note that in the figure the states are shown such that high is equivalent to the switch being on or conducting.

Figure 3A:
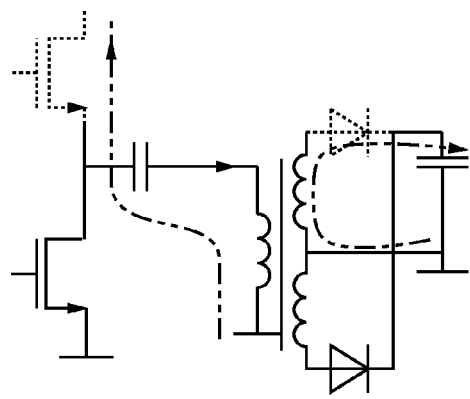
FIG. 3 ($a$)-3($h$) show the current paths in a power converter operated in accordance with an embodiment of the present invention, during various phases of the method.

Referring to FIG. 2 the switching cycle of the power converter may be considered to commence just after the start of the interval 24. At the start of interval 24 the LSS 4 is switched off as shown in trace 18. Just after this time the HSS 3 is switched on as shown in trace 19. Current flows through the primary coil 6 of the transformer and the HSS. A current is induced in the secondary circuit through diode 8 to produce an output current Iout. The currents during this phase are shown in FIG. 3(a), where the dashed components (HSS 3 and output diode 8) indicates that these components are switched on, or conducting. That is, the current in the primary side flows through the primary coil, and the HSS.

Figure 3B:
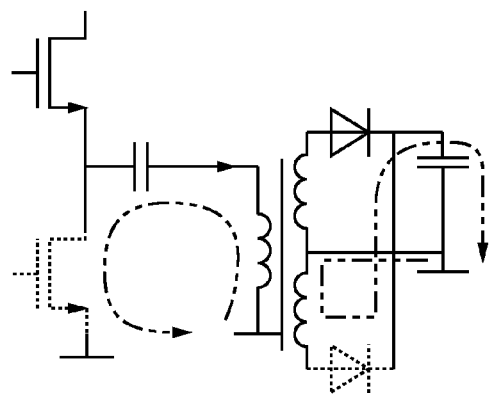

After a suitable period which may typically be a fraction of a resonant period (that is, at the end of interval 24), the HSS 3 is switched off, and shortly thereafter the LSS 4 is switched on, as shown in traces 19 and 18 respectively. During the subsequent phase of operation, shown in interval 26, there is a resonant current flowing around the primary winding 6 of the transformer the resonant capacitor 5 and the LSS 4. A corresponding induced current will flow in the secondary circuit as shown in FIG. 3b. This secondary current flows through diode 7, to produce an output current Iout as shown. The output current Iout thus has two peaks as shown in trace 16. At the end of each peak the current returns to zero.

During the next phase, shown as interval 28 in FIG. 2 and through which LSS 4 is maintained on, the magnetisation current is negative. Denoting the magnetisation current by $I_1$, the energy in the transformer is then half the product of the inductance and the square of $I_1$:

$$E = 0.5(Lm+Ls) \times I_1^2$$

Figure 3C:
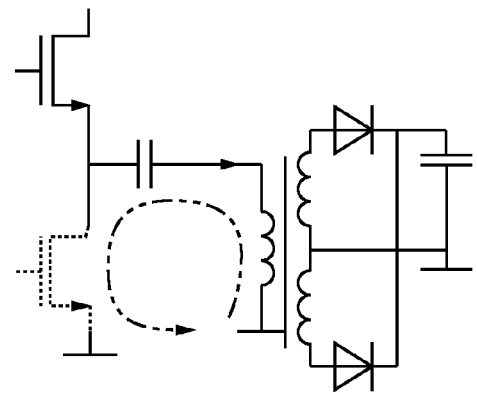

As can be seen from FIG. 2 the primary current 14 returns from a negative value to zero at the end of interval 28, and the output current is zero, as shown in FIG. 3(c).

Figure 3D:
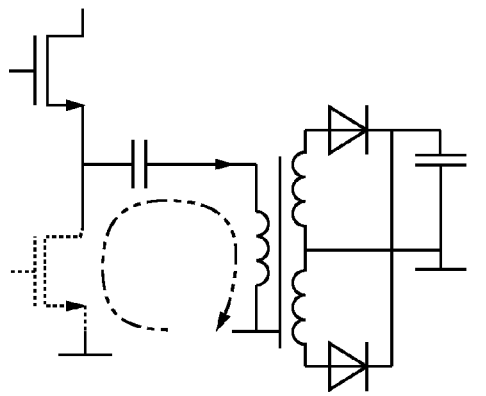

During the next phase 30 the primary current 14 has a positive value and the magnetisation current is positive. Current continues to resonate in the primary circuit consisting of the primary winding 6, resonant capacitor 5, and LSS 4; however, the current now is travelling in the opposite sense. This is shown schematically in FIG. 3(d).

Figure 3E:
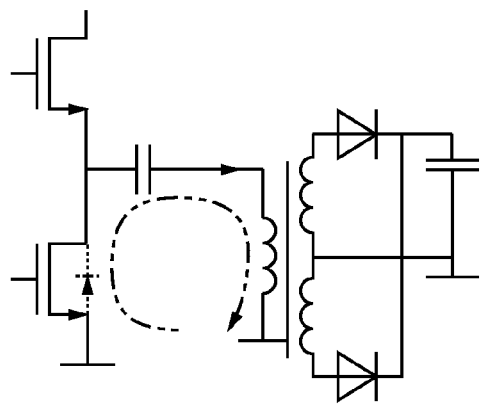
Figure 3F:
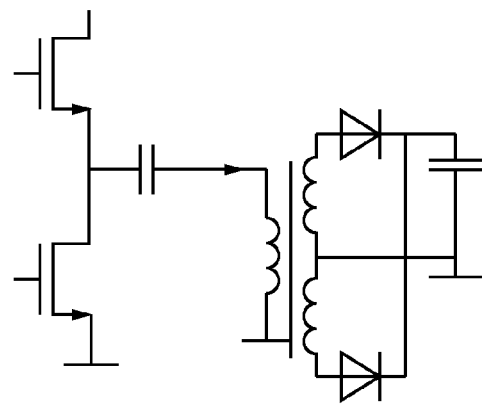
Figure 3G:
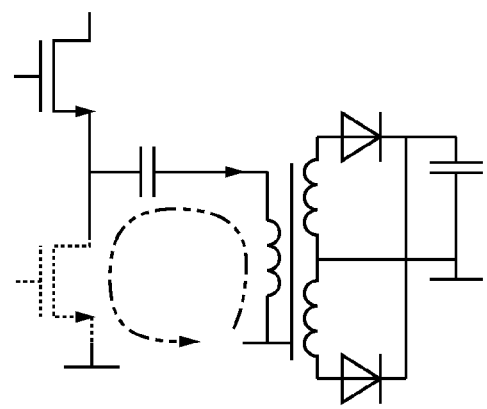
Figure 3H:
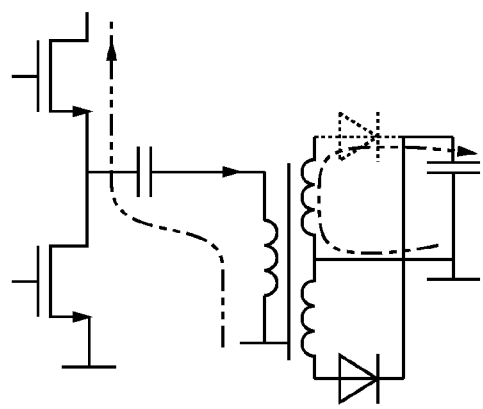

When the primary current next returns to zero, or just prior to this moment, the LSS 3 is switched off. This is shown in FIG. 2 at the start of phase 32. The equivalent current is shown in FIG. 3(e). Here, the LSS 4 is switched off to interrupt the switching cycle. The LSS is switched off at a moment when the magnetisation current is positive just prior to the moment when the magnetisation current would be equal to zero, as shown at the interface between phases 30 and 32 of FIG. 2. In a practical device according to the embodiment it is particularly convenient to switch off the LSS while the magnetisation current is still positive and just prior to the moment when it would be zero, in order to counter the effects of residual "body diode" current in the switch: this body diode current can result in a reverse recovery time that causes the primary current to become slightly negative. During these phases there is some residual conduction through the body diode of LSS 4, as shown in FIG. 3(e). During phases 32 and 34 the residual energy in the transformer (that is: $0.5 \times (Lm+Ls) \times I_1^2$) is transferred to the resonant capacitor Cr, 5. At the end of phase 34, the voltage at node 12, (that is, Vcap) reaches a negative maximum which may be denoted by Vcapneg; mean-while, the voltage at the half bridge node 10, Vhb is still zero.

Figure 4:
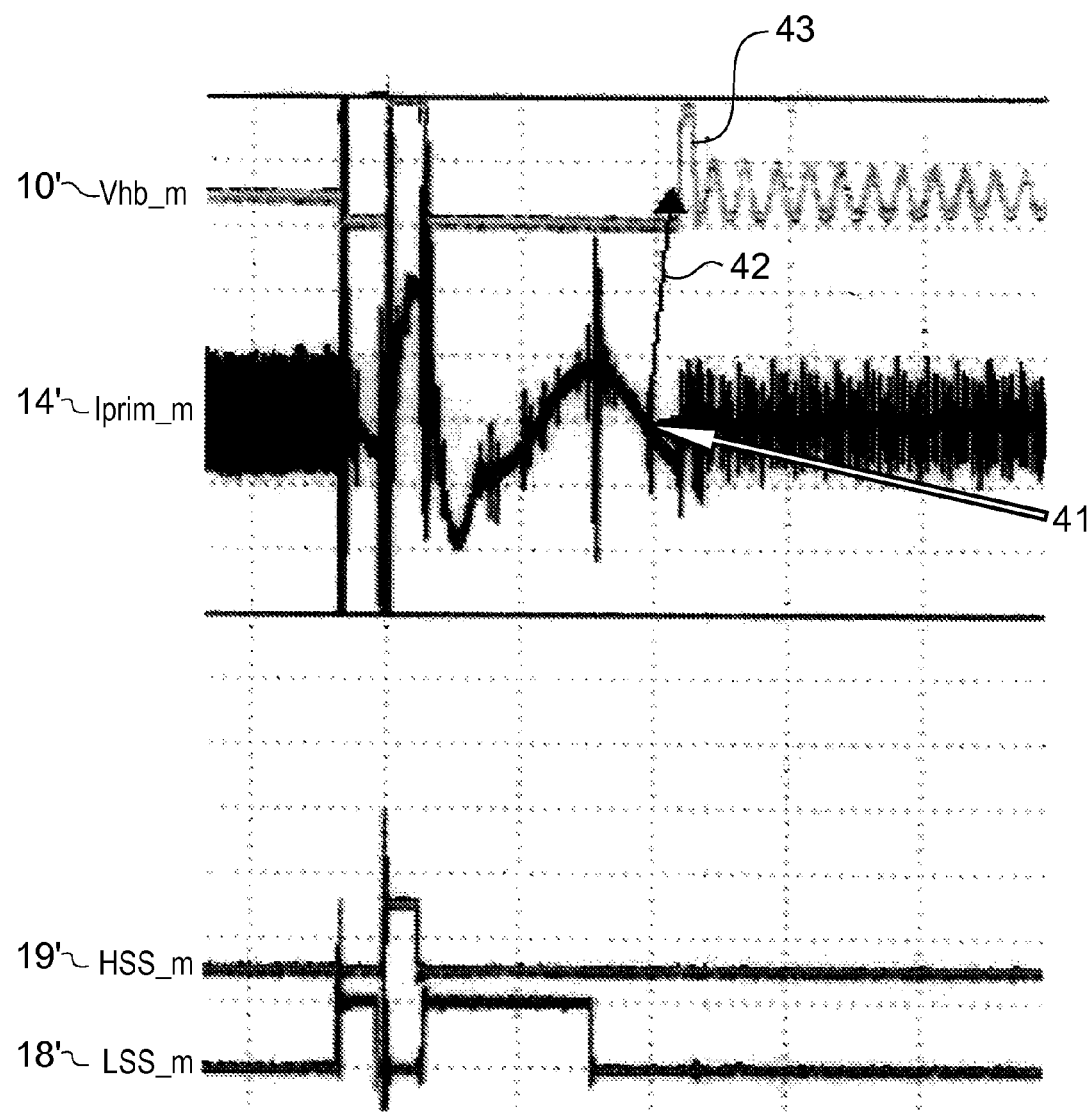
FIG. 4 shows measurements of the half bridge voltage and primary current of a resonant power converter having a delay between the zero crossing of the primary current and the rise in the half bridge voltage.

As described above, it is particularly convenient to switch off the LSS just prior to the moment when the magnetisation current would be zero. This will now be described with reference to FIG. 4, which shows the effect of switching off the LSS at a moment which is earlier than the optimum moment, as follows: FIG. 4 shows the measured half bridge voltage Vhb_m, referenced 10', and measured primary current Iprim_m, referenced 14', for a practical device, along with the measured HSS_m and LSS_m states 19' and 18'. The residual "body diode" current in the switch 3 when switched off, can result in a reverse recovery time that causes the primary current to become slightly negative (see to the right of point 41). This results in a larger amplitude of the magnetizing current—which gives extra losses, and the extra energy is dumped into the load (at 42) giving an undesired step in power (as shown at peak 43). The delay between zero crossing of Iprim_m and the start of the Vhb_m oscillation in a typical device can be in the region of several µs; one approach to compensating for the effect, is to bring forward the start of phase 32 by a comparable amount, as shown in FIG. 4. However, the actual switch-off moment does not move forward by the same amount, since it is prevented by reverse recovery of the body-diode.

To optimise for the delayed switch off of the body diode the start of phase 32 is shifted to the right (related to the situation in FIG. 4) to the extent such that the actual switch-off moment of the switch comes close to the zero crossing of the current. In this way the current in the body-diode can flow only for a short time and at a lower current level (the interval between switch-off and current reverse). Therefore much less energy is stored in the body-diode. The result of this is that the actual switch-off moment is very close to the gate signal switching. (In FIG. 4 the switch is in fact switched off too early giving charge storage in the body diode causing a delay of several µs between zero crossing of the current and actual start of the rising slope of Vhb.) In contrast, switching the switch off as close as possible to the actual zero crossing of the current, avoids the problems associated with switching it off earlier. That is, it avoids charge storage and an actual switch-off moment with a delay related to the actual zero crossing that is approximately equal to the difference between switch-off moment and zero crossing. Switching it off later therefore has approximately the same effect than switching it off earlier, and in a preferred device, the switch-off moment is within one µs, or even within 0.5 µs, either side of the zero crossing moment.

Reverting now to the description of the main sequence: at the end of phase 34, energy has been stored in the resonant capacitor 5. Also, since neither of the switches 3 and 4 are conducting, the current in the primary circuit is effectively zero. Because of this, this state can be maintained for a large time interval without further significant dissipation in the converter. The length of time for which this state is maintained can be chosen to a large extent at will, without significant restriction to any specific periodicity or moments in time, and thus the switching cycle period can be controlled in a continuous fashion, with no restriction to discrete values.

As shown in phase 36 of FIG. 2, there is some residual resonance in both Vhb and Vcap. Vcap resonates around an average value of zero, whilst Vhb resonates around an average value of −Vcapneg. This resonance is associated with a small energy of $0.5 \times Chb \times Vcapneg^2$; this small energy dissipates if longer period times are applied, and the resonance damps out. However, the major part of the system energy, that is to say, an energy equal to $0.5 \times Cr \times Vcapneg^2$, remains available and is stored in the resonant capacitor. This is the state shown towards the end of phase 36 in FIG. 2 (which corresponds to the end of phase 20 from the previous cycle).

Figure 5:
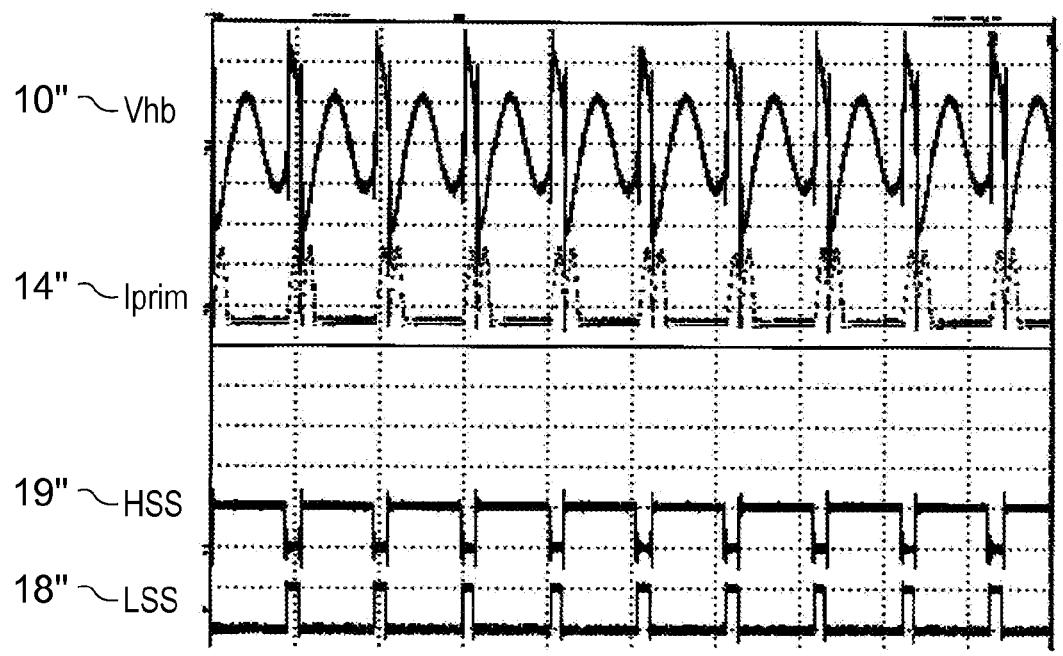
FIGS. 5, 6 and 7 show simulated measurements of operating a resonant power converter including an interruption of 0, 1 and 8 resonance cycles of the half bridge capacitance Chb, respectively.
Figure 6:
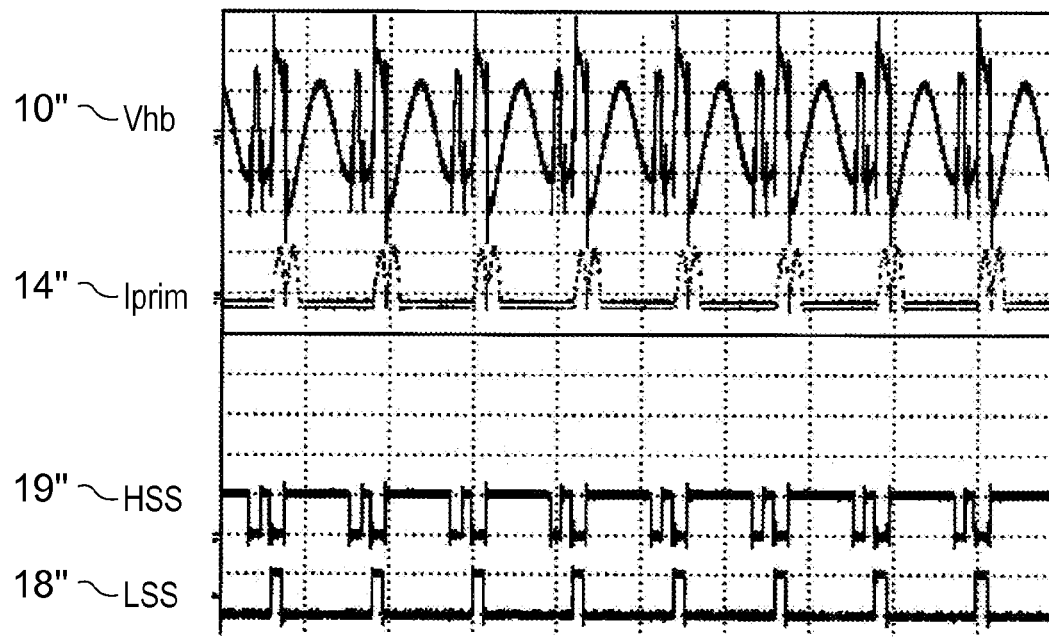
Figure 7:

In preferred embodiments hard-switching is undesired due to capacitive discharge giving current spikes and causing disturbance. Therefore the start of the phase 22 is preferably chosen close to the valley of 12 (Vcap). As long as Vcap is not damped out significantly, even the small loss in energy by Chb oscillating with an amplitude Vcapneg is partly prevented. Although this gives a limited restriction to the periodicity (Chb,(Ls+Lm)), it is much smaller and less significant than for conventional converters, where a complete resonant cycle defines this quantization (Cr,(Ls+Lm)). Measurements of this mode of operation are shown in FIGS. 5, 6 and 7, in which the phase 36 lasts for, respectively 0, 1 and 8 oscillations of Chb, that is, for 0, 1 and 8 ringing cycles of Vhb respectively.

After a suitable period of interruption, that is at the end of interval 36, the LSS 4 is switched on to resume the switching cycle. Switch-on of the LSS is shown in FIG. 2 at the start of phase 22, and the current flowing during phase 22 is shown in FIG. 3(*g*). At the end of phase 22 the LSS 4 is switched off at a moment corresponding to the appropriate level of Vcap, and as shown in FIG. 3(*h*).

The LSS 4 is switched off and the HSS 3 switched on at the start of phase 24; similarly the HSS 3 is switched off and the LSS 4 switched on at the start of phase 26. A brief dead time, during which neither switch is on, is provided prior to the closing of each switch, in a conventional way known to those skilled in the art to facilitate low loss zero voltage switching or soft switching. It is the case that zero voltage switching is not available for the closing of the LSS after the interruption 32, 34 and 36, so some degree of hard switching results. However, as the voltage over the switch at the switch-on moment is only a small part of the input voltage, especially if the end of phase 36 (/20) is chosen close to a valley of Vhb, and switching losses are proportional to the square of this voltage, the switching losses resulting are acceptable.

The method of this embodiment has been described relative to a power converter operated according to the co-pending patent application of the same applicant (International Patent Application PCT/IB2008/052654). It will have been observed that in that method the HSS is turned on only for a short fraction of the normal cycle, during which time power is supplied to the load and a resonant circuit is charged. The LSS is then closed subsequent to a dead time once the HSS has been opened. The switches are held in this state for a long time (relative to the normal switching period), and a resonance is set up. At a particular phase during the resonance, the energy in the resonance circuit is correctly positioned, to switch off the LSS ready to switch on the HSS with zero voltage switching; the cycle then restarts.

Since the energy per cycle is fixed, the output power in that method varies inversely with the switching period. This, however, is quantised, since it is only practical to switch off the LSS at the correct point in the resonance, in fact just prior to or at a minimum of the magnetising current. As described above, the present invention removes this quantisation, and allows for a continuum of switching period and thus output energy. The inventor of the present invention has appreciated that there is a set of conditions under which the switching cycle may be interrupted for an effectively arbitrary length of time; specifically, energy can be stored in the resonance capacitor Cr with both switches open. If the condition is met that there are no currents elsewhere in the circuit, then, to a first approximation, this energy store is stable. Both switches can then be left open for an effectively arbitrary length of time, before the LSS is closed and the cycle resumed: i.e. the LSS is opened, at an appropriate level of Vcap according to the required converted energy level, generally prior or just prior to a minimum of the magnetising current.

As described, although to a first approximation the energy storage is stable, in practice there will be excess energy stored, relating to the capacitance at the half bridge node (Chb). This excess energy results in a small fast resonance which partly damps out depending on the damping and period time.

Although the embodiment above has been described in relation to a method of operating a resonant power converter which is principally targeted at very low load or standby operation, it will be readily appreciated to a person skilled in the art that the invention is applicable to other methods of operating a resonant power converter. In particular, it will be possible to utilise further embodiments of the invention in the operation of a resonant power converter under burst mode conditions. That is, a resonant power converter which is operated for a first time period under 50% duty cycle conditions, and then effectively switched off for a second time period.

Figure 8:
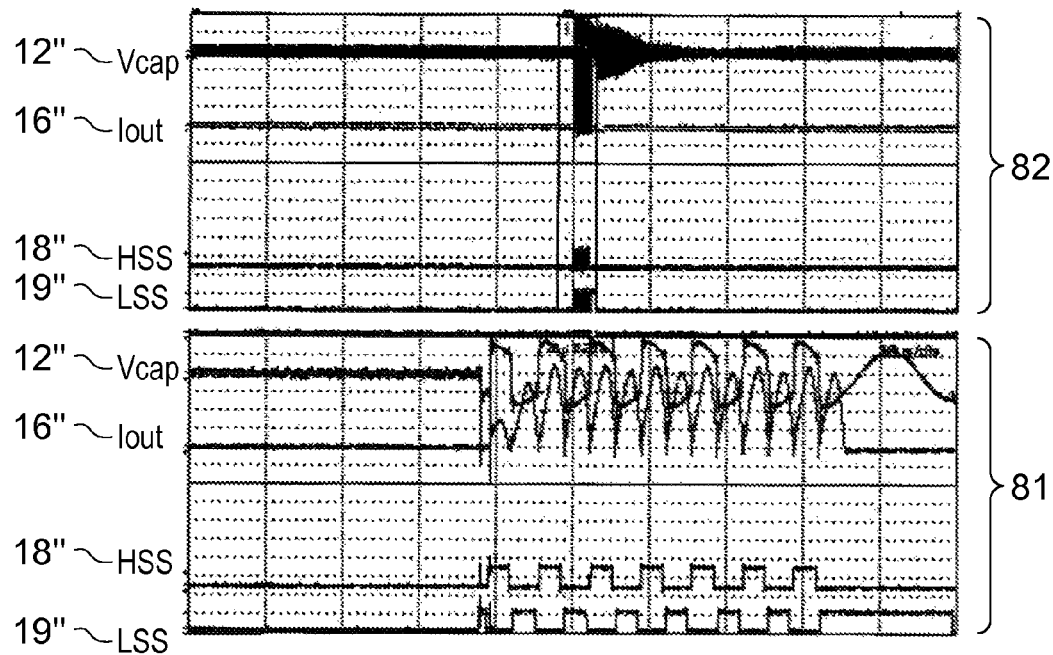
FIGS. 8 and 9 show measurements of operating a resonant power converter in two variants of burst mode operation.

The output power of the power converter is controlled by altering the respective time intervals of the first and second time periods. One such further embodiment is shown in FIG. 8. In this Figure, which illustrates operation at a very low power level, several 50% duty-cycles pulses (shown with an enlarged timescale in the lower part 81 of FIG. 8, and with a compressed timescale, at the centre of the top part 82 of the figure), are followed by a relatively long interrupted period 36, the damping of which is evident in the top part of the figure.

Figure 9:
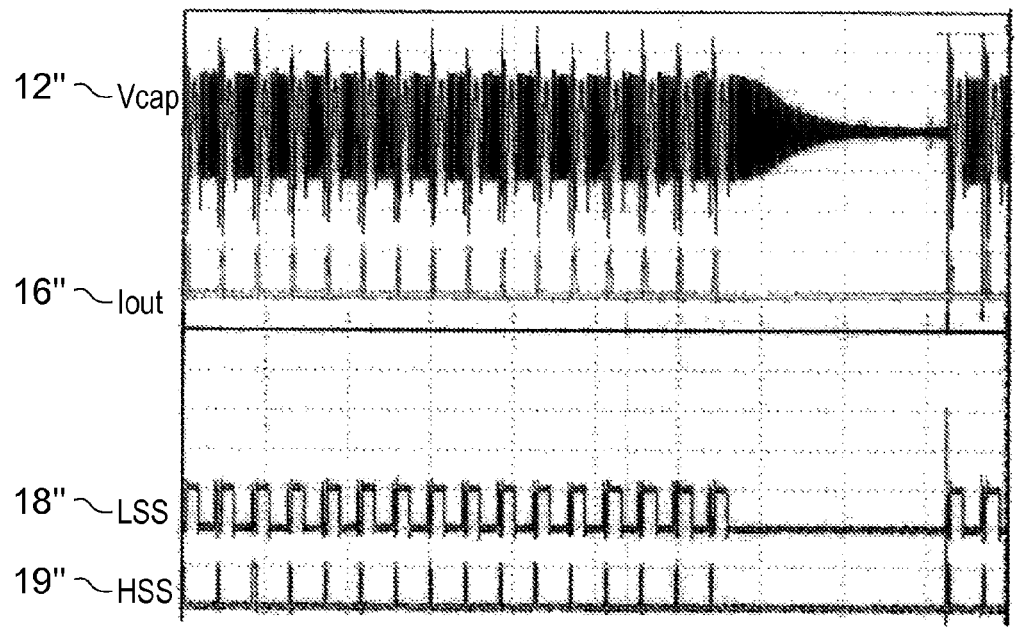

A second such further embodiment is illustrated in FIG. 9, which shows a burst mode operation with low power during the burst-on time. In this example, each duty-cycle, of a first duration, in the nominal burst-on part of the operation includes an energy storage period (28-34 of FIG. 2), an interruption period (36 of FIG. 2) and energy restorage period (22 of FIG. 2), to provide low power operation, but in addition, "burst-off" periods are provided, of a longer duration, by means of the fact that they have an extended interruption period. As shown in FIG. 9, the "burst-off" longer period allows for more decay in Vcap (12"), than do the burst-on shorter periods.

In this second embodiment, the burst-on periods are described as fixed, but it will be equally apparent, that they can be allowed to vary, for instance they may gradually increase during the burst, or gradually decrease during the burst.

For a better understanding of a further embodiment of the invention, the concept of state plane representation will be used herebelow.

Figure 12:
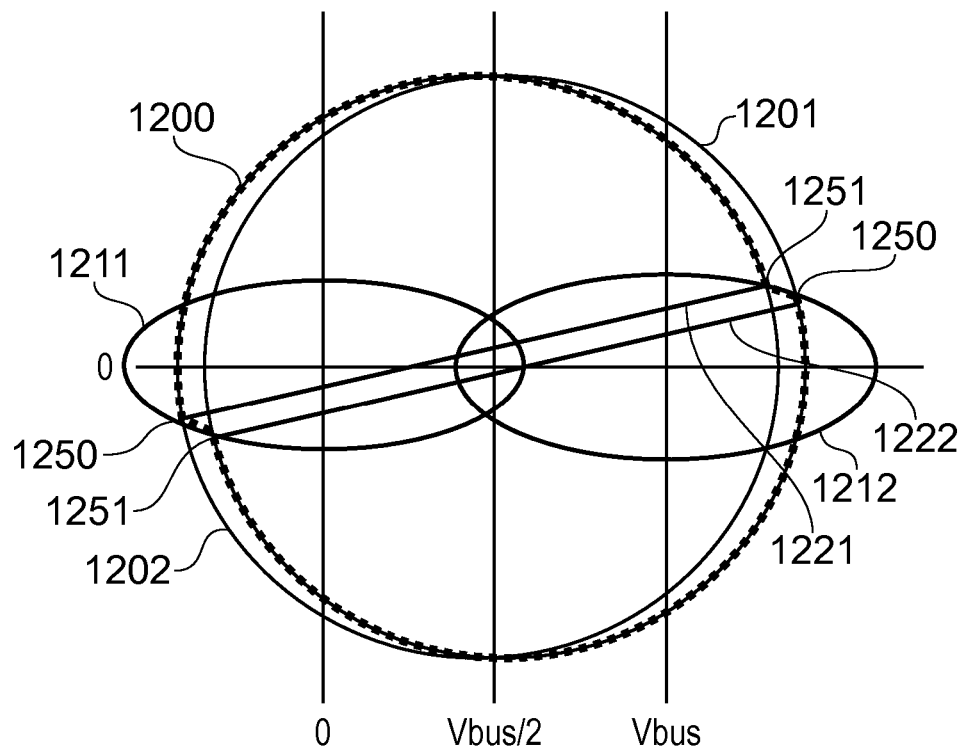
FIG. 12 is a state plane representation of a power converter operating in normal or high power mode.

An example of a state plane representation of a power converter operating in high-power, discontinuous, mode is shown in FIG. 12. In the state plane representation the voltage, Vcr, across the resonant capacitor is plotted on the horizontal axis against a representation of the primary current Iprim. For convenience the primary current is scaled by a factor of $(Ls/Cr)^{0.5}$. For a resonance, an ellipse (or when appropriately scaled, a circle) results, which in the horizontal axis is centred around a "forcing voltage". The forcing voltage at any moment is the momentary voltage across the resonating components.

If the resonance is lossy, then energy is dissipated, so instead of the locus being a circle (or ellipse), it spirals inwards.

As shown in FIG. 12, in the case of a power converter operating at a normal high-power operation in discontinuous mode, the locus of operation follows a clockwise trajectory 1200 which traces for its most part one of two circles 1201 and 1202. Both circles 1201 and 1202 are centred around zero in the vertical, that is to say, current, axis. In the horizontal, that is to say, voltage, axis, the circle 1201 is centred around (Vhb−Vout_reflected), at a moment when Vhb=0 and Vout_reflected is negative and slightly smaller than Vbus/2: as a result, the centre of circle 1201 is slighty to the right of, that is to say larger than, Vbus/2. Correspondingly, circle 1202 is centred about (Vhb−Vout_reflected) at a moment when Vhb=Vbus and Vout_reflected is positive: as a result, the centre of circle 1202 is slighty to the left of Vbus/2. It will be appreciated that Vout_reflected is slightly larger than Vbus/2 in this case in order to provide discontinuous mode operation, but this is not a restriction for the invention. It is also possible to choose Vout_reflected smaller than Vbus/2. In this latter case high power mode continuous conduction mode occurs, in which the secondary diodes are continuously on in high power mode.

When the locus of operation is following part of circle 1201, this corresponds to a resonance between Cr and Ls, at a frequency determined by Cr×Ls with a one of secondary diodes 7 or 8 conducting; correspondingly, when the locus of operation is following part of circle 1202, this corresponds to a resonance around Cr and Ls, at the same frequency determined by Cr×Ls with the other one of secondary diodes 7 or 8 conducting.

When neither of the secondary diodes 7 and 8 are conducting, the locus of operation follows a part of either of two other ellipses 1211 and 1212. These are both similarly centred around Iprim=0, and around Vcr=Vhb, at times when Vhb=Vbus or Vhb=0 respectively, and correspond to resonance around Cr and (Ls+Lm), at a frequency determined by Cr×(Ls+Lm).

Along with the four ellipses 1201, 1202, 1211 and 1212 which define the trajectory 1200, two straight line constructs 1221 and 1222 are also drawn in FIG. 12. Each line connects, for one half cycle, the point 1250 where the switch starts to conduct with the point 1251 where the magnetising current equals the primary current. Point 1250 corresponds to the moment when the secondary diode starts to conduct, resulting in a rise of the magnetizing current and point 1251 corresponds to the moment when the respective secondary diode turns off as the magnetizing current equals the primary current. It should be noted that these straight lines are only to indicate that the magnetizing current rises during the secondary diode conduction times and point 1251 depends on point 1250 in a way that can be approached by a straight line. The actual magnetizing current would not be accurately represented by a straight line.

Figure 13:
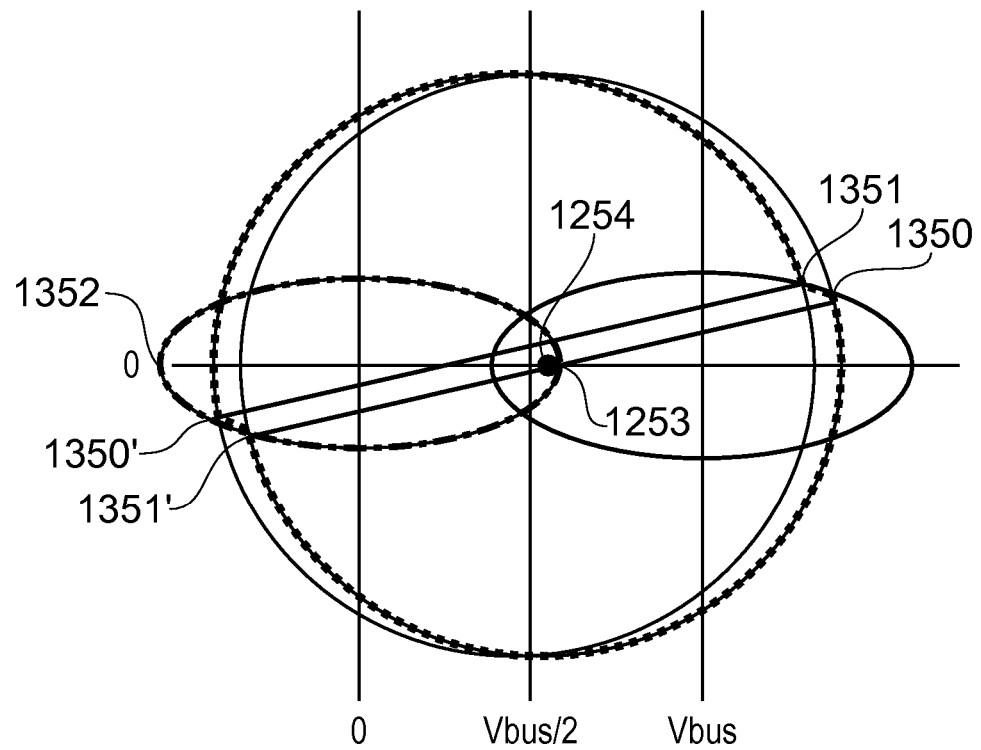
FIG. 13 is a state plane representation of a power converter operating in a low power mode.

FIG. 13 depicts the state plane representation of a power converter operating in a low-power mode according to previously described embodiments of the invention. The locus of operation follows a trajectory, which is based on the same 4 ellipses 1201, 1202, 1211 and 1212 described above with reference to FIG. 12. As in the high-power operation, the locus follows circle 1350 through 1351' to 1350' whilst the LSS is closed (on), corresponding to the interval 26 of FIG. 2.

However, unlike the high-power operation, in this case the low side switch LSS is not switched off at 1350'. The trajectory follows ellipse 1211, to point 1352, at which the current Iprim is zero. The section of ellipse 1211 corresponds to interval 28 in FIG. 2. The trajectory continues around ellipse 1211, in a clockwise direction, until just before it reaches point 1253, at which once again, Iprim would be equal to zero. This section of ellipse 1211 corresponds to intervals 30, 32 and 34 of FIG. 2. (The end of interval 30 corresponds to the top of the ellipse and 34 ends at the moment where the primary current again is 0). The LSS is then switched off, resulting in a small 'circular' resonance 1254.

It should be noted that this embodiment is in this respect different from that depicted in FIG. 2, since the latter shows the LSS being switched at the end of interval 30. A reason to take the end of 30 for LSS switch-off—as shown in the embodiment of FIG. 2, is that the zero-crossing of Vcap can easily be detected. However there is a reverse recovery effect of the body diode of the LSS giving undesired delay and recovery of the bodydiode after the end of interval 34. This is not shown in FIG. 2 or FIG. 13, (but it is indicated in FIG. 4) and the effect is that Iprim becomes slightly negative (building up undesired energy in Lm) and the top of the first ringing of Vhb during interval 36 reaches Vin, delivering back energy to the supply. Both effects are undesired.

Taking into account both the undesired effects due to delay and recovery of the bodydiode after the end of interval 34, it may be concluded that the most preferred moment for LSS turn off should be as close as possible to the end of 34.

In the state plane representation of FIG. 13, the 'circular' resonance is shown as 1254, and is centred around Iprim=0 and a voltage just less than, that is to say to the left of, position 1253. This small resonance is due to a residual energy ringing as both HSS and LSS are off. Moreover, since the resonance is lossy, it is actually an inward spiral, rather than an exact circle or ellipse. The inward spiral 1254 trajectory corresponds to interval 36 of FIG. 2.

Put in other terms, at the start of 32 node vcap reaches Voutreflected=0 giving a maximum in the primary current (Vcap is voltage across primary transformer winding=Vhb−Vcr) The end of interval 34 indicates when the primary current reaches 0. The LSS should be turned off at a positive current, so somewhere in interval 30, 32, 34, but preferably as close as possible to the end of 34, to prevent reverse recovery effects that would cause undesired delay, as shown in FIG. 4. The end of interval 30 can easily be detected. (negative zero-crossing of node Vcap). The small resonance continues during interval 36.

At the end of the interval 36, the LSS is switched on (closed), and the trajectory closely follows ellipse 1211, again in a clockwise direction. In practice, since the resonance 1254 was lossy, the trajectory will not follow ellipse 1211 exactly, but will have a slightly smaller radius. This difference is not shown in FIG. 13. This trajectory is followed to position 1350', (or rather, to be more exact taking into account the above loss, to a position just above 1350'), at which point ellipse 1211 intersects with circle 1202. This part of the trajectory corresponds to interval 22 in FIG. 2. The high side switch HSS is switched on (closed) and the trajectory rejoins circle 1202, at the start of interval 24 in FIG. 2.

Figure 14A:
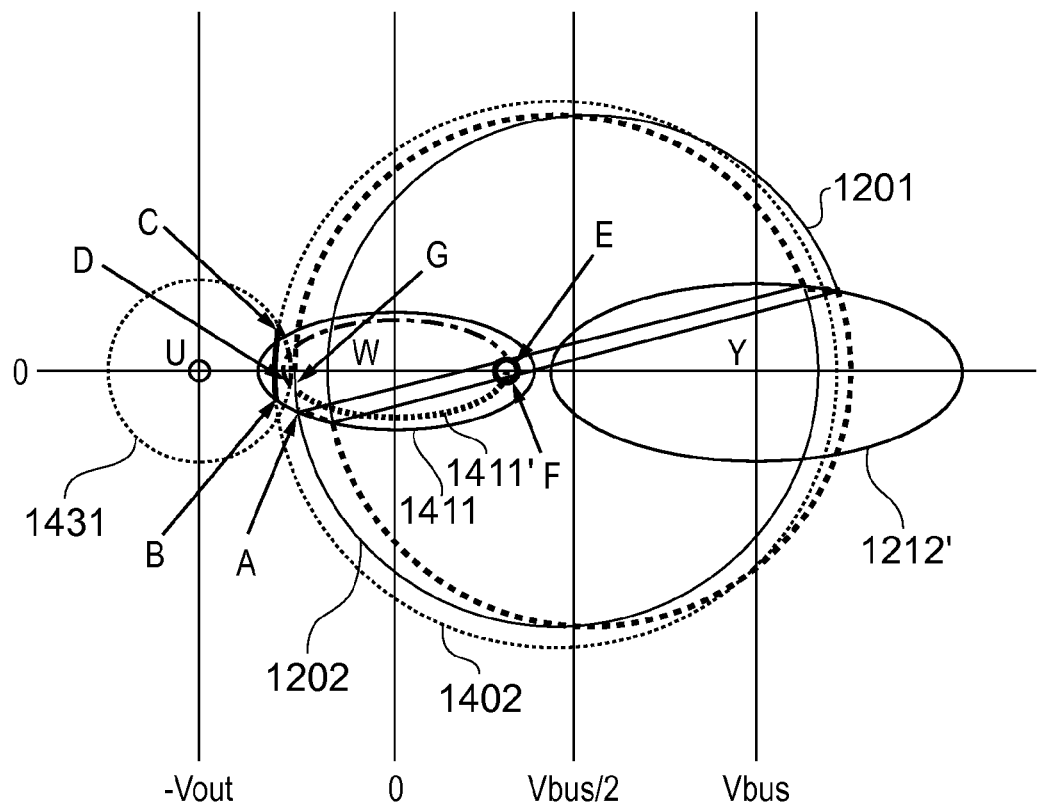
FIG. 14 is a state plane representation of a converter operating in a low power mode including energy dump, in accordance with embodiment of the invention, and, FIG. 15 shows waveforms of a converter including an energy dump interval.
Figure 14B:
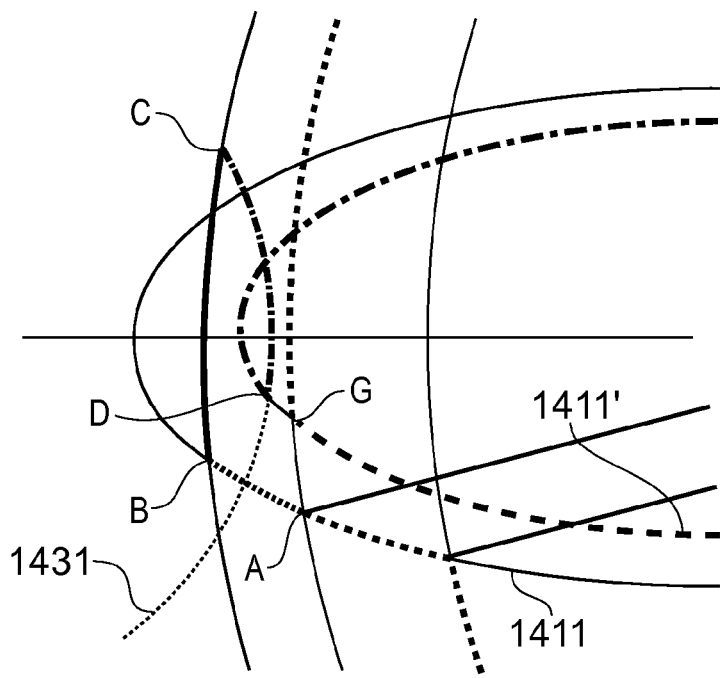

As just indicated the LSS is turned on at the start of the next energy restorage phase 22, after the amplitude of the ringing 1254 has damped. There is then a voltage Vcr at the half bridge node, resulting in some hard-switching and therefore some switching losses. However, those switching losses are not dominant. During 1254 the half bridge node rings with an amplitude that is determined by the momentary voltage at Vcr at the moment that the LSS is turned off (which is the moment that the primary current reverses). At that moment, the voltage at node vcap equals −Vcr, thereby giving an oscillation around the steady state solution (Vcap=0, which corresponds to the case when the spiral is damped out); this oscillation occurs as a voltage across the series connection between Chb and Cr, giving therefore a voltage across Vcr determined by the capacitive division between Cr and Chb A further embodiment of the present invention will be described below with reference to a further state plane representation, which is shown in FIG. 14. The power converter operation represented by the state plane representation of FIG. 14 that is similar to that of FIG. 13, but includes an "energy dump" phase. This energy dump phase is described in detail in the applicant's co-pending international patent application PCT/IB2008/052654 the entire contents of which are hereby incorporated by reference. Associated with the inductor is a primary side, or switching, inductance Ls, together with a magnetising, or mutual, inductance Lm. In a quiescent state, a resonance occurs associated with inductance Lm+Ls (and capacitance Cr); relative to a conversion resonance which is associated with inductance Ls only the period of the quiescent resonance is longer. In effect, from one viewpoint, the energy dump interval is just an extra "sub-routine" starting at point B and ending at point D. However as result part of the energy present in the resonance (1411) is converted to the output during the interval B-C-D resulting in the fact that less energy resonates further during the interval D-E and E-G, which gives the advantage of the desired reduction in magnetizing losses during D-E and E-G and reduced switching losses.

From consideration of the state diagrams of FIG. 12 and FIG. 13, it is possible to deduce that the following are desiderata: firstly, it is desirable to create a trajectory in the low-power mode, which follows the high-power mode trajectory as closely as possible, especially as regards converted energy; and secondly it is desirable to use a trajectory during energy storage (and re-storage), which has as small an area as is practical. These desiderata are met according to the state plane diagram shown in FIG. 14, incorporating an "energy dump" phase.

A method of operating a power converter, including an "energy dump" as described above is depicted in the state plane representation shown in FIG. 14. This state plane representation is constructed, similarly to FIGS. 12 and 13, around 4 ellipses, but this time includes two additional circles 1431 and 1402. Two of the four ellipses (1201 and 1202) are the same as those shown in FIGS. 12 and 13, and 1212' is nearly the same as ellipse 1212, but slightly modified as will be discussed below; however, ellipse 1211 is replaced by a smaller ellipse 1411, which itself is supplemented by an additional, smaller ellipse 1411' which is concentric with it. The first circle 1402 is centred around Iprim=0, and Vcr=(Vhb−Vout_reflected), where Vhb=0, and Vbus and Vout_reflected being positive. Hence, it (that is, circle 1402) is concentric with circle 1202, (with centre around Vcr=Vbus−Vout_reflected), but has a slightly larger radius which is indicative of a higher stored energy. The second additional cycles is also centred, in the y-axis, about Iprim=0, and in the x-axis is centred on a position Vcr=−Vout_reflected, (since Vhb=0 and the positive diode is conducting—that is, the same diode as during the normal HSS conduction interval, giving Vcr=0−Voutreflected=−Vout_reflected). Ellipse 1212' is a slightly modified version of ellipse 1212: because ellipse 1411' is smaller than ellipse 1411, and because of the different starting value for the magnetizing current compared to FIGS. 12,13 there results a different Iprim, Vcr combination where the secondary diode turns off, thus defining a different radius for 1212' relative to 1212.

The locus of operation will now be described, and then this trajectory will be discussed in terms of operation of the device: for a large part of the operation, the trajectory in the follows that of power converter under normal operation; that is to say the feature directory follows, in a clockwise direction, circle 1202 until it intersects with ellipse 1212; the trajectory follows ellipse 1212 until that, in turn intersects with circle 1201, and to the trajectory then follows curve 1201 until that is, in turn intersects with ellipse 1411. In contrast to the previous embodiment, the trajectory follows ellipse 1411 across its intersection with circle 1202 shown as 'A'. The trajectory continues to follow ellipse 1411 until it intersects with the larger circle 1402, at 'B'. The trajectory then follows the circle 1402 in a clockwise direction until this, in turn, intersects with circle 1431, at 'C'. The trajectory then follows a clockwise path around the circle 1431 centred on (Iprim=0, Vcr=−Vout_reflected). When the circle intersects with the smaller ellipse 1411' based around the Vcr=0 after the zero-crossing crossing in the primary current, the energy dump ends as the secondary diode turns off and the trajectory moves on to this ellipse, again in a clockwise fashion. Thereafter it follows a path similar to that described in the previous embodiment. That is to say, the trajectory moves around ellipse 1411' until it reaches a position close where the ellipse crosses the x-axis, that is says 1253 in FIG. 13 and point 'E' in FIG. 14. The trajectory then enters a small spiral 1254 shown as 'F' in FIG. 14, and on leaving the spiral it follows a path closely following, but slightly inside the ellipse 1411', until this path intersects with circle 1202, at which point 'G' the trajectory recommences the cycle. Looking to FIG. 14a, it follows that point B is the start of the energy-dump interval. Vcr at point B can have any value as long as the amplitude of ellipse 1411 as result has a sufficient amplitude to pick up point G.

The trajectory as indicated in FIG. 14 and described above is valid for Vout_reflected>Vbus/2, which is the preferred embodiment giving the so called Discontinuous Conduction Mode (DCM). It is also possible to choose Vout_reflected<Vbus/2 giving the so called Continuous Conduction Mode (CCM). In CCM the centre of the circles (Vbus−Vout_reflected and Vout_reflected) are at the other side of the line Vcr=Vbus/2. In this case ellipse 1202 has no meaning as the trajectory along 1202 is followed by a trajectory with a circle with centre around −voutreflected in between. When the value of the primary current reaches the magnetizing current, the centre changes to +Vout_reflected again.

The skilled person will appreciate that due to the low power trajectory between AG the magnetizing current (Ilmscaled is a scaled version of the magnetizing current) is slightly different at point G in this case, than it is for the high power operation described above. This results in a slightly different (Vcr, iprimscaled) combination at the moment that the secondary diode is turned off and therefore a slightly different trajectory and ellipse around Vhb=Vbus, than is the case for high-power operation. Therefore FIG. 14 shows the principle of operation, and the combination of ellipses and circles are not identical between the high power trajectory (discussed in FIG. 12), and the complete low power trajectory of embodiments, because of the changed magnetizing current. Further, it will be appreciated that in a practical implementation, also the transition from one trajectory to the next is not as abrupt as indicated by FIG. 14, for example point 'C' is somewhat rounded due to the limited voltage rise and fall times of node Vhb in combination with recovery of the HSS body-diode and limited rise and fall times of node Vout_reflected giving the centre vhb−Vout_reflected to change gradually its position in time.

The trajectory will now be described to with the reference to operation of the device. The high-powered mode trajectory is followed until point A, where the LSS is kept on, for longer than would be the case for high-power operation. The trajectory follows the path AB, show as dotted in FIG. 14. At position B, the LSS is turned off. Due to the delay in a switching off the LSS, Vcr at point B is smaller than at point A. The next part, BC, of the trajectory, a show as a solid line in FIG. 14, corresponds to the actual "energy dump interval", during which time both switches are off. During this interval, the half-bridge node is first rapidly charged to Vbus by the positive primary current allowing the body diode of the HSS to start conducting, and the one of the secondary output diodes which is associated with the positive half cycle starts conducting. Thus, during this part of the cycle, of the trajectory is following a circular path 1402 around a voltage (Vhb−Vout_reflected). During this part of the trajectory the sign of the primary current reverses (since the trajectory crosses the x-axis), and the half bridge node is started to discharge to ground as soon as the body-diode of the HSS has recovered. By position C, the HSS body-diode is effectively turned off, and the half bridge node thereafter rapidly falls to ground whilst the trajectory follows path CD, around the circle with a forcing voltage of −Vout. During this interval CD, the positive primary current decreases and the magnetising current increases. Somewhere along this trajectory CD, the low side switch LSS is turned on again to actively keep the half bridge voltage Vhb at or close to zero and prior to the polarity of the primary current again becoming negative. At position D, the primary current and the magnetising current are equal, resulting in the secondary diode being switched off. As a result the trajectory again changes direction, to follow the elliptical trajectory DE (dot-dash curve) around the forcing voltage of Vcr=0, as both Vhb=0 and the secondary diode is off. (Although it is not preferred, it is alternatively allowed that at point D the LSS is not turned on. The body-diode of the LSS then recovers due to the negative current and a slightly smaller ellipse than 1411' is followed, starting just above point D. As soon as the primary current becomes positive the body-diode of the LSS again conducts until 1253 is reached). Close to the moment where point E is reached, the LSS is turned off and when the primary current crosses 0, a trajectory 1254 around point F is followed, while now the parasitic capacitance Chb at the half bridge node in series with Cr resonates with Ls+Lm. As Cr is relatively large compared to Chb and Vcr can be seen as forcing voltage determining point. The last part of the trajectory, shown as dashed in FIG. 14 trajectory FG Where G is the desired Vcr value to reach the desired energy conversion trajectory GA.

A yet further embodiment of the invention, relates to use of the energy dump concept, in combination with an extra inductor, Lseries, in series with both secondary diodes (that is, between the secondary diodes and the output capacitor). This results in a modification to "Vout_reflected", because in this case "Vout_reflected" is not fixed since an additional voltage U, where U=Lseries×dI Lseries/dt, is now in series with Vout.

Figure 15:
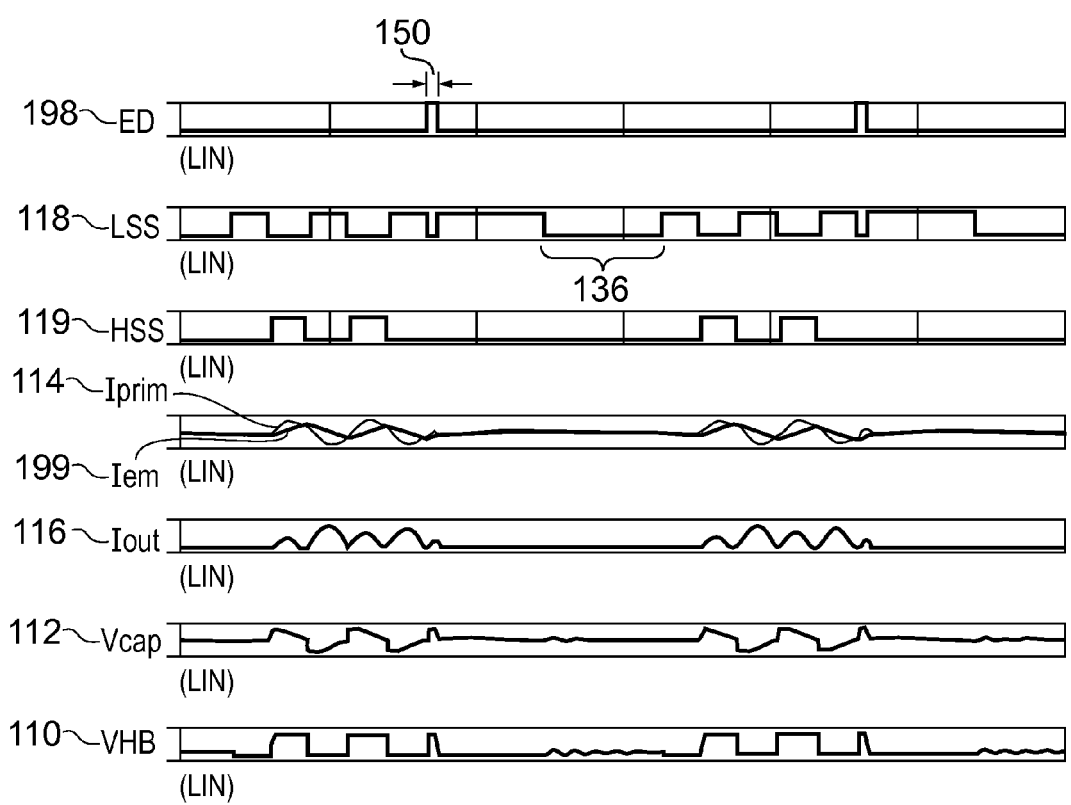

Waveforms according to this further embodiment, including the energy dump concept depicted in the state plane representation of FIG. 14, are shown in FIG. 15. Thus equivalent reference numbers are used relative to those in FIG. 2, for corresponding waveforms, viz: 110 and 112 represent VHB and Vcap respectively; 118 and 119 represent the on-off state of the LSS and HSS respectively; Iprim is shown at 114, and Ilm is also shown, newly reference to add is 199; the output current Iout is shown at 116. Newly described in this embodiment is trace ED, shown at 198, which corresponds to an energy dump phase. This embodiment is similar to that depicted in FIG. 2 in that there is a phase 36 (shown at interval 136 in FIG. 15) during which both HSS and LSS are open (i.e. off). However, this embodiment differs from that in FIG. 2 in that there is an additional period shown at 150 in ED trace 198, during which both switches are open. In relation to the timing diagram shown in FIG. 2, this phase occurs just prior to the start of interval 28. Energy dump proceeds according to the disclosure of WO-A-2009-04582, the entire contents of which are hereby incorporated by reference. An effect of the energy dump is to reduce the amplitude of the magnetising current during the energy storage and re-storage intervals.

The embodiment shown in FIG. 15 may be termed 'discontinuous mode energy-dump'. The term 'discontinuous' is appropriate, since there is an interval where the secondary diodes are off until at point B the energy-dump starts. Alternative embodiments (not shown in the figures) provide 'continuous mode (CCM) energy-dump'; in these embodiments, one of the secondary diodes still conducts at the start of the energy-dump interval. Using this 'CCM' option, it is possible to directly go to the small spiral without first dump and then following the first half of ellipse 1411' until the spiral is reached. The advantage in such embodiments is that only the lower part of the ellipse (during the energy re-storage phase (F-G)) is used. The upper part is not used at all, saving core losses and reducing the minimum wait time between 2 energy conversion cycles. This enables the transition from high power mode to low power mode at a higher power level, giving more freedom and possibilities to optimise the system.

Figure 10:
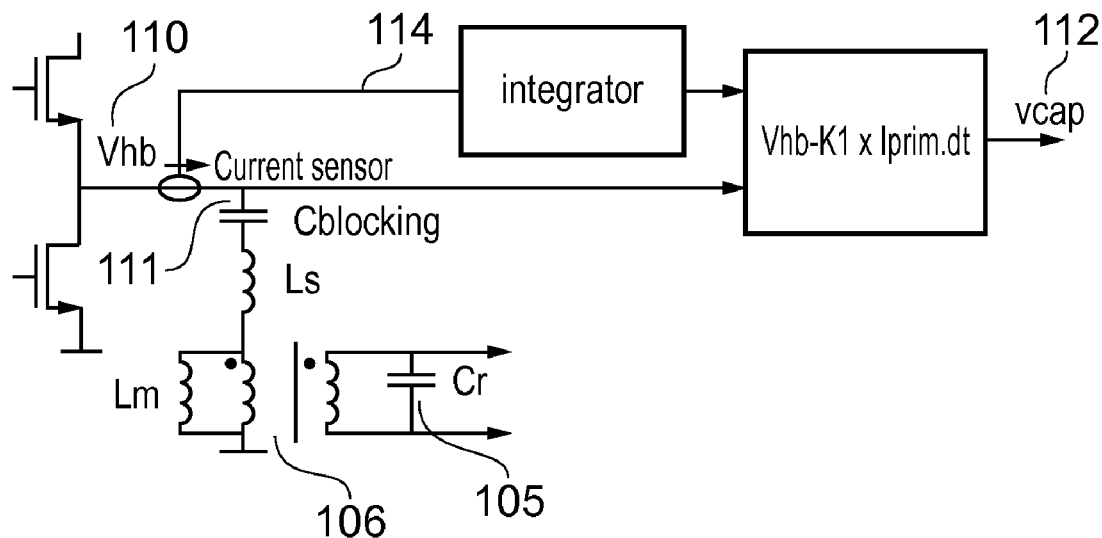
FIG. 10 is a schematic diagram of an example parallel resonant power converter.

The embodiments above have been described with respect to a power converter in which the resonant capacitor is connected between the half bridge node and the primary coil of the transformer. However, the invention is also applicable to other designs of resonant power converter; for example a power converter in which the resonant capacitor is connected between the primary winding 6 of the transformer and ground. In this case the voltage Vcap is not available, which can be overcome by any of three means: One is to use the principle of FIG. 10 to make an indirect representation of Vcap. A second solution is to calculate Vhb−Vcr as a representation of Vcap, where Vcr is the voltage over the resonant capacitor. A third is to use an additional auxiliary winding on the transformer, coupled closely to the primary winding The embodiments above relate primarily to series resonant converters, in which the resonant capacitor Cr is in series with the transformer. However, the invention also encompasses operation of parallel resonant converters, in which the resonant Cr (105) is in parallel with the transformer instead of in series. The series capacitor 111 is only a DC blocking capacitor. Therefore the signal Vcap (112) is derived from an integration of the primary current 114 and subtracted from Vhb (110) to get a representative of Vcap. Further, it will be apparent that the invention is not limited to half-bridge converters, but is equally applicable to full-bridge converters; the skilled person will appreciate that the term "half-bride node", used herein is to be interpreted to include both a half-bridge node within a half-bridge converter, and a half-bridge node within a full bridge converter.

Figure 11:
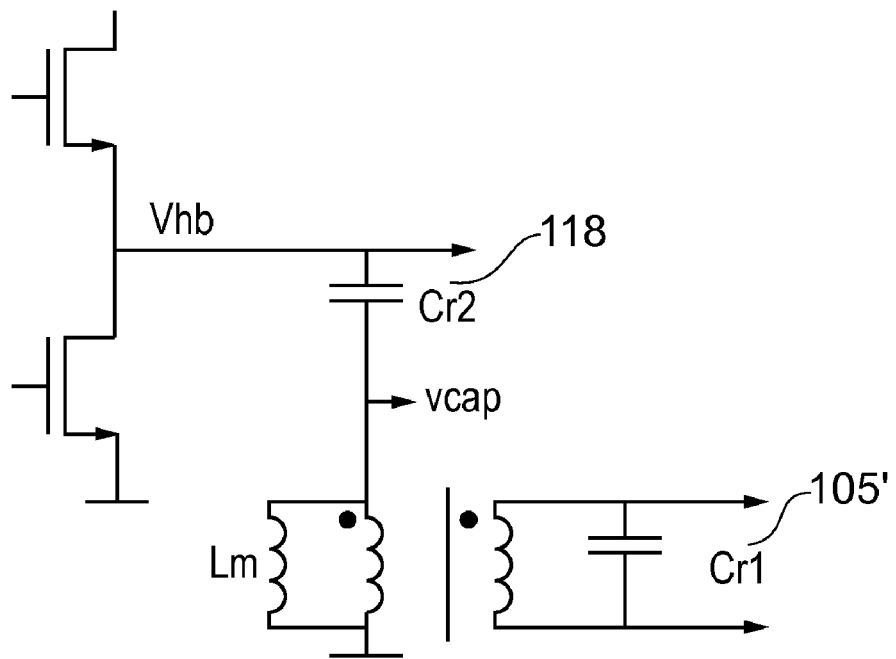
FIG. 11 is a schematic of a LCC resonant power converter.

Furthermore, while the embodiments above relate to LLC resonant converters, it will be readily apparent to the person skilled in the art that the invention has application in other converter topologies. An example of such an other resonant converter topologies whose operation is encompassed within the invention is shown in FIG. 11. This figure shows a conventional LCC resonant power converter. In this case, in addition to the first capacitor 105', a second capacitor Cr2 (118) is used in place of the inductor Ls of an LLC converter, to form an LCC converter, which, as is well known, can be used to advantage with fixed input voltage and output voltage.

A controller according to another aspect of the invention is arranged to provide signals to control the switches 3 and 4, such that the resonant power converter operates according to the method of the above embodiments. The controller may be implemented through hardware, software, or a mixture of hardware and software. The controller may be implemented in a separate package from switch drivers, or may be implemented in the same package or in the same semiconductor device. Further, the controller may be integral with the drivers, in which case the signal, may comprise gate signals for the switches From reading the present disclosure, other variations and modifications will be apparent to the skilled person. Such variations and modifications may involve equivalent and other features which are already known in the art of power converters, and which may be used instead of, or in addition to, features already described herein. Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Various features which are, for brevity, described in the context of a single embodiment, may be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A method of controlling a resonant power converter, the resonant power converter having a switching cycle period and comprising a primary side circuit comprising a first switch and a second switch connected in series and having a half-bridge node therebetween, the primary side circuit being connectable between a supply voltage and a ground,
  a resonant capacitor forming part of a resonance circuit, and
  an inductor forming another part of the resonance circuit, the method comprising the steps of:
    at the start of the switching cycle period closing the first switch for a first period,
    opening the first switch at the end of the first period and thereafter closing the second switch for a second period,
    opening the second switch at the end of the second period and thereafter closing the first switch to conclude the switching cycle period,
  characterised in that the method includes the step of interrupting the second period by
    opening the second switch at the end of an initial part of the second period,
    storing energy in the resonant capacitor whilst the second switch is open, and
    closing the second switch for the remainder of the second period.

2. A method according to claim 1 wherein the second switch is opened to interrupt the second period at a moment when there is substantially no current in the primary side circuit.

3. A method according to claim 1 wherein the second switch is opened to interrupt the second period at a moment when the current in the primary side circuit is approximately zero.

4. A method according to claim 3 wherein the second switch is opened to interrupt the second period within 0.5 microseconds of a moment when there is no current in the primary side circuit.

5. A method according to claim 1, further comprising a delay between opening the first switch and closing the second switch such that zero voltage switching of the second switch occurs.

6. A method according to claim 1, further comprising a second delay between opening the second switch and closing the first switch such that zero voltage switching of the first switch occurs.

7. A method according to claim 1, wherein the initial part of the second period has a duration which is longer than a resonance period of the resonance circuit, the resonance period being associated with the power converter being in a state wherein a secondary diode in a secondary side circuit of the resonant power converter is conducting.

8. A method according to claim 1, wherein at least the duration of the initial part of the second period is adapted for use with a resonant power converter in which the resonant capacitor is connected between the half bridge node and a Vcap node.

9. A method according to claim 1, wherein at least the duration of the initial part of the second period is adapted for use with a resonant power converter in which the resonant capacitor is connected to the second switch and connectable in use to ground.

10. A method according to claim 8, wherein the duration of the first period and the duration of the second period are each controlled in dependence on the voltage at the Vcap node, to achieve a desired energy transfer per cycle.

11. A method according to claim 10 wherein the duration of the first period and the duration of the second period are each further controlled to achieve a desired switching cycle period.

12. A method according to claim 1, wherein the resonant power converter comprises a series resonant power converter.

13. A method according to claim 1, wherein the resonant power converter comprises a parallel resonant power converter.

14. A method according to claim 1, including a further step of within the initial part of the second period, opening the second switch thereby starting an energy dump interval, and closing the second switch thereby defining the end of the energy dump interval.

15. A method according to claim 14, wherein the second switch is closed at the end of the energy dump interval at a moment when the primary current reverses polarity.

16. A method according to claim 14, wherein the second switch is closed at the end of the energy dump interval at a moment which is after the primary current reverses polarity and which is when the voltage at the half-bridge node is at a negative maximum.

17. A method according to claim 14, wherein the second switch is opened to start the energy dump interval at a moment at which a magnetizing current in the inductor is at a negative maximum.

18. A method according to claim 14, wherein the second switch is opened to start the energy dump interval at a moment when the modulus of the voltage across the resonant capacitor is equal to the modulus of the voltage of the resonant capacitor at the start of the second period.

19. A method as claimed in claim 1, wherein the step of interrupting the second period further comprises an energy dump interval.

20. A controller for a resonant power converter, the resonant power converter having a switching cycle period and comprising a primary side circuit comprising a first switch and a second switch connected in series and having a half-bridge node therebetween, the primary side circuit being connectable between a supply voltage and a ground, the resonant power converter further having a resonant capacitor forming part of a resonance circuit, the controller being adapted to control the operation of the first switch and the second switch in accordance with the method of claim 1.

21. A controller as claimed in claim 20, further comprising a respective drive circuit a drive circuit for driving each of the first and the second switches.

22. A controller as claimed in claim 20, wherein the controller including the respective drive circuits is packaged in a single package.

23. A controller as claimed in claim 22, wherein the controller including the respective drive circuits is implemented on a single semiconductor chip.

* * * * *